United States Patent Office 3,063,031
Patented Nov. 6, 1962

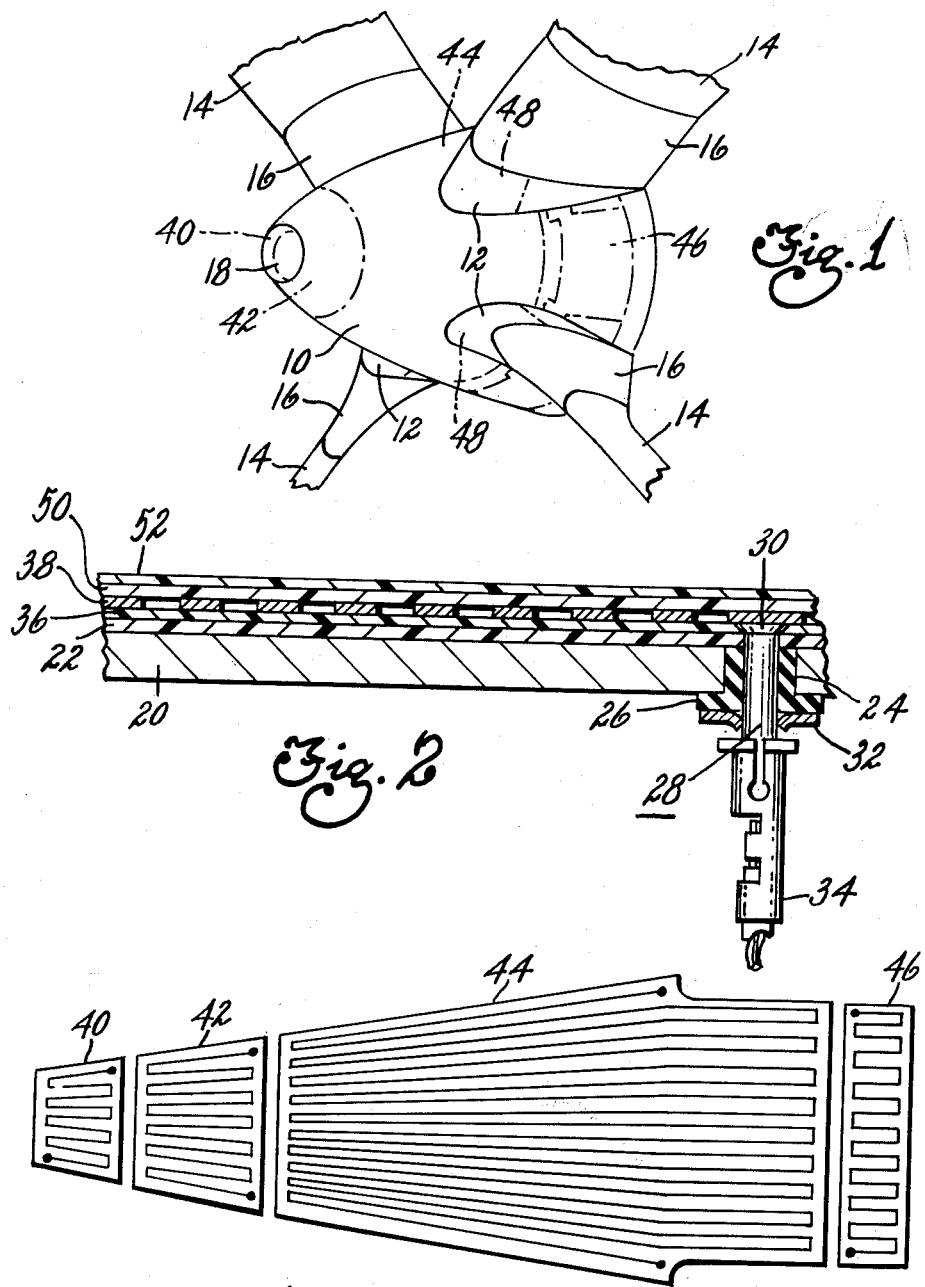

3,063,031
ELECTRICAL AIRCRAFT HEATER
Jack T. Edwards, Akron, and Russel E. Line, Dayton, Ohio, assignors to General Motors Corporation, Detroit, Mich., a corporation of Delaware
Filed Dec. 28, 1959, Ser. No. 862,330
6 Claims. (Cl. 338—275)

This invention pertains to electrically heated apparatus for aircraft, and particularly to an electrical heater construction and the method of applying a heater to an aircraft surface.

Present day aircraft, and particularly propeller driven aircraft, must be equipped with both de-icing and anti-icing apparatus, the former of which is used to remove accumulated ice, and the latter of which is used to prevent the formation of ice. Heretofore, many different types of electrically operated heaters have been proposed, but have not come into wide use due to the initial expense of installation and the difficulty of making repairs. The present invention relates to a built-up electrical heater for aircraft surfaces which requires a minimum of skilled labor to apply, presents a smooth outer surface, and can be readily repaired in the field.

Accordingly, among our objects are the provision of an electrically heated anti-icing and/or de-icing apparatus for aircraft surfaces; and the further provision of a method of applying such electrically heated apparatus to an aircraft surface.

The aforementioned and other objects are accomplished in the present invention by utilizing one or more flexible heating elements sandwiched between layers of insulating material and adhesively bonded to the aircraft surface. Specifically, the electrically heated anti-icing or de-icing apparatus can be applied to any metallic surface such that when it is completed, the apparatus comprises inner and outer layers of fiberglass impregnated with a cured electrical insulating thermo-setting plastic material, the inner layer of which is bonded to the metallic supporting surface. One or more flexible backed heater elements having copper grids etched thereon are sandwiched between the inner and outer layers of insulating fiberglass and suitably connected by terminals supported on the aircraft surface. The apparatus is thereafter covered with an abrasion and erosion resistant coating to form a smooth outer surface.

The method of applying the heating apparatus to a metallic aircraft surface comprises the steps of coating the metallic surface with an unfilled epoxy resin; applying preimpregnated fiberglass containing a suitable catalytic curing agent for the epoxy resin and thereafter subjecting the fiberglass to heat and pressure so as to cure the epoxy resin whereby the fiberglass will be bonded to the aircraft surface. Thereafter, the flexible heater elements are fitted over the insulating layer of impregnated fiberglass, and after fitting of the elements, the fiberglass base insulating layer is coated with an unfilled epoxy resin as is the outer surfaces of the elements. A second layer of preimpregnated fiberglass is laid over the elements and is then subjected to heat and pressure to cure the epoxy resin so that both the elements and the outer layer of insulation will be adhered to the surface. Finally, the outer surface of the second insulating layer is sprayed with abrasion and erosion resistant material which is thereafter cured.

Further objects and advantages of the present invention will be apparent from the following description, reference being had to the accompanying drawing, wherein a preferred embodiment of the present invention is clearly shown.

In the drawing:

FIGURE 1 is a fragmentary view, in perspective, of the propeller having electrical heating apparatus constructed according to the present invention.

FIGURE 2 is an enlarged fragmentary sectional view of a typical cross-section of the spinner surface with the heating apparatus attached thereto.

FIGURE 3 is an enlarged view, in elevation, of the typical elements used in the apparatus.

With particular reference to FIGURE 1, a propeller assembly of the general type shown in copending application Serial No. 572,348 filed March 19, 1956, now Patent No. 2,986,220, in the name of Bodem et al., and assigned to the assignee of this invention, is depicted comprising a generally parabolic spinner 10 having four radially projecting islands 12 through which adjustable pitch propeller blades 14 project. The propeller blades 14 have cuff elements 16 attached to the shank portions thereof, the cuff elements having an airfoil cross-section and preferably constructed in accordance with copending application Serial No. 688,462 filed October 10, 1957, in the name of Edwards et al. and assigned to the assignee of the present invention. The spinner 10 has a centrally arranged air inlet opening 18 in the nose portion thereof through which cooling air is admitted.

The spinner shell is preferably composed of aluminum, the aluminum spinner shell being depicted by numeral 20 in FIGURE 2. In applying the electrical heater to the spinner shell, the outer surface of the shell 20 is coated with an unfilled organic resin, such as a phenolic or an epoxy. As an example of epoxy resins which are suitable, the epoxy resin may be a liquid phase resin having an epoxy equivalent of less than 200, or may be a solid phase resin having a higher epoxy equivalent which is dissolved in any suitable solvent such as a ketone, an ester or an ether alcohol. Preferably, the thickness of the organic resin coating is .003".

A fiberglass sheet 22 impregnated with a cured electrical insulating thermo-setting plastic material is bonded to the outer surface of the spinner shell 20. The thickness of the fiberglass sheet may be on the order of .020" in the area which is to be anti-iced and .040" thick in the area which is to be de-iced. A de-iced area is an area in which the electrically heated element is continuously energized, whereas an anti-iced area is an area in which the heaters are only intermittently energized. The fiberglass sheet 22 may be preimpregnated with an epoxy resin and catalytic curing agent such as diamino diphenyl sulfone, or a phenolic or polyurethane resin.

After the entire outer surface of the spinner shell 20 and the islands 12 have been fitted with preimpregnated fiberglass sheets, the spinner shell is placed within a vacuum bag. The vacuum bag is thereafter evacuated so that the fiberglass sheets are maintained under a pressure of substantially one atmosphere. The spinner shell is then placed in an oven for approximately one hour and maintained at a suitable curing temperature.

Prior to attaching the initial insulating fiberglass layers to the spinner shell 20, the necessary terminal elements are attached to the spinner shell. As seen in FIGURE 2, the spinner shell 20 is formed with openings 24 which receive rubber grommets 26. A terminal stud 28 having a frusto conical enlarged head 30 is inserted into the grommet 26 and held in the desired position with the head 30 projecting above the outer surface of the spinner shell 20, by a spring-type lock washer 32. A suitable terminal 34 may be connected to the stud 28 as shown in FIGURE 2.

The preimpregnated fiberglass sheet 20 is disposed beneath the frusto conical head of the terminal stud 28. After the resin impregnated in the fiberglass sheet has been cured, and the fiberglass sheets have been bonded to the outer surface of the spinner shell, the upper surfaces of the frusto conical terminal heads 30 are cleaned.

The electrical heater elements comprise a flexible backing, such as phenolic, having copper grids etched thereon. The phenolic base is indicated by numeral 36 in FIGURE 2 and the copper grids indicated by numeral 38. As seen in FIGURE 3, the heating elements are made up in sections adapted to fit the contour of the spinner shell. A plurality of sections are used for each quarter segment of the spinner shell, these sections being indicated by numerals 40, 42, 44 and 46. The grids of the sections 40, 42 and 44 are connected in series after attachment to the insulating fiberglass sheet 22 and are continuously energized for anti-icing. The section 40 is adapted to fit into the air inlet opening 18. The section 42 fits over the nose portion, and the section 44 fits between the islands 12. The sections 46 as well as the sections 48 on the spinner area are connected in a de-icing circuit, and thus are only intermittently energized. The flexible backings which carry the copper grids are trimmed to form a smooth profile by fitting the several sections over the spinner surface. The upper surface of the terminal heads 30 are masked, and the base insulation comprising fiberglass sheets 22 is covered with a coat of unfilled organic resin. The heating elements are then applied to the spinner surface, and the terminal portions of the grids are connected to the terminals by soldering. Thereafter, the spinner shell is placed in an oven and the shell is brought to a suitable curing temperature to bond the flexible backing of the heating elements to the base insulating sheet 22.

A third coat of unfilled resin is thereafter brushed on the outer surface of the heating elements, after which a second layer of preimpregnated fiberglass having a thickness of .020″ is laid thereover. The spinner shell is again placed in a vacuum bag which is evacuated so that the outer fiberglass layer is maintained under a pressure of substantially one atmosphere. The spinner shell is then again placed in an oven for an hour at a suitable curing temperature.

After the spinner shell is removed from the oven and the vacuum bag, an abrasion and water erosion resistant covering is applied to the outer surface fiberglass layer 50. This abrasion and water erosion resistant covering is depicted by the numeral 52 and may comprise a spray coat of polyurethane filled with pulverized ceramic material, or a liquid phase epoxy resin filled with pulverized ceramic material. Preferably the thickness of the abrasion and water erosion resistant coating 52 is approximately .010″. If a polyurethane spray coating is used, the spinner may be air dried. However, if an epoxy resin is used as the spray coat, the spinner must be again placed in an oven maintained at a suitable curing temperature.

The electrical heating apparatus disclosed herein can be readily applied to an aircraft surface of any shape or contour, and has excellent heat transfer characteristics. Moreover, the process of applying the heater to a metallic aircraft surface requires a minimum of skilled labor and can be readily repaired in the field by merely cutting through the outer abrasion resistant coating and the outer fiberglass layer 50, to repair the deffective grid section.

By continuously heating the nose portion of the spinner under icing conditions, this spinner portion is maintained wet. The water flowing towards the rear of the spinner due to forward motion of the aircraft will freeze and accumulate as ice on the islands 12 and the portion of the spinner between the islands which are de-iced. When the de-icing elements are energized, the contiguous layer of ice between the spinner and the accumulated ice will be melted so that the ice will be thrown off, or shed, in rather large peices due to centrifugal force.

While the embodiment of the invention as herein disclosed constitutes a preferred form, it is to be understood that other forms might be adopted.

What is claimed is as follows:

1. The method of producing electrically heated de-icing or anti-icing apparatus, including, first applying to the surface of an article a layer of thermo-setting resin, applying an inner layer of electrical insulating material impregnated with a thermo-setting resin, vacuum bagging the electrical insulating material and curing the thermo-setting resin, applying flexible backed electrical resistance elements, applying an outer layer of electrical insulating material impregnated with a thermo-setting resin, curing said thermo-setting resin, and applying an abrasion and water erosion resistant coating.

2. The method of producing electrically heated de-icing or anti-icing apparatus, including, first applying to the surface of an article a layer of thermo-setting resin, applying an inner layer of electrical insulating material impregnated with a thermo-setting resin, curing the thermotor-setting resin, applying a coating of thermo-setting resin to the outer surface of said first layer of insulating material, curing said coating of thermo-setting resin, applying flexible backed electrical resistance elements, applying an outer layer of electrical insulating material impregnated with a thermo-setting resin, curing said thermo-setting resin, and applying an abrasion and water erosion resistant coating.

3. The method of producing electrically heated de-icing or anti-icing apparatus, including, first applying to the surface of an article a layer of thermo-setting resin, applying an inner layer of electrical insulating material impregnated with a thermo-setting resin, applying flexible backed electrical resistance elements, applying an outer layer of electrical insulating material impregnated with a thermo-setting resin, vacuum bagging the second layer of insulating material and curing the thermo-setting resin thereof, and applying an abrasion and water erosion resistant coating.

4. Electrically heated de-icing and anti-icing apparatus, including, a metallic supporting surface, inner and outer layers of electrical insulating material impregnated with a thermo-setting resin, flexible backed electrical resistance heating elements interposed between the inner and outer layers of insulating material comprising copper grids on a phenolic backing, terminals carried by the supporting surface and electrically connected to said heating elements, and an abrasion and water erosion resistant coating covering the outer layer of insulating material.

5. Electrically heated de-icing or anti-icing apparatus, including, a metallic supporting surface, inner and outer layers of electrical insulating material impregnated with a thermo-setting resin, flexible backed electrical resistance heating elements interposed between the inner and outer layers of insulating material, terminals carried by the supporting surface and electrically connected to said heating elements, and an abrasion and water erosion resistant coating covering the outer layer of insulating material comprising polyurethane filled with pulverized ceramic material.

6. Electrically heated de-icing or anti-icing apparatus, including, a metallic supporting surface, inner and outer layers of electrical insulating material impregnated with a thermo-setting resin, flexible backed electrical resistance heating elements interposed between the inner and outer layers of insulating material, terminals carried by the supporting surface and electrically connected to said heating elements, and an abrasion and water erosion resistant coating covering the outer layer of insulating material comprising a liquid phase epoxy resin filled with pulverized ceramic material.

References Cited in the file of this patent

UNITED STATES PATENTS

| | | |
|---|---|---|
| 2,276,004 | Vidal et al. | Mar. 10, 1942 |
| 2,425,088 | Dean | Aug. 5, 1947 |
| 2,500,449 | Bradley | Mar. 14, 1950 |
| 2,627,012 | Kinsella et al. | Jan. 27, 1953 |
| 2,698,893 | Ballard | Jan. 4, 1955 |
| 2,741,692 | Luke | Apr. 10, 1956 |
| 2,745,931 | Heibel | May 15, 1956 |
| 2,843,711 | Crick | July 15, 1958 |